S. BANIČ.
MOTOR SLEIGH.
APPLICATION FILED APR. 22, 1914.
1,228,088.
Patented May 29, 1917.
2 SHEETS—SHEET 2.
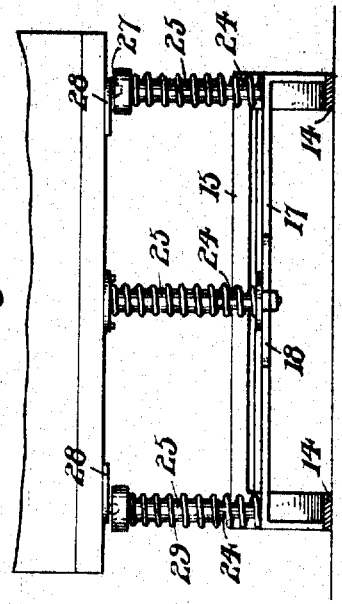
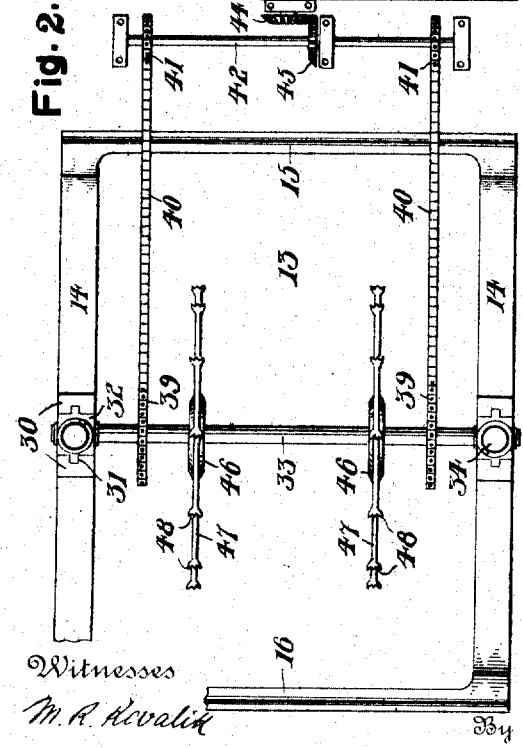
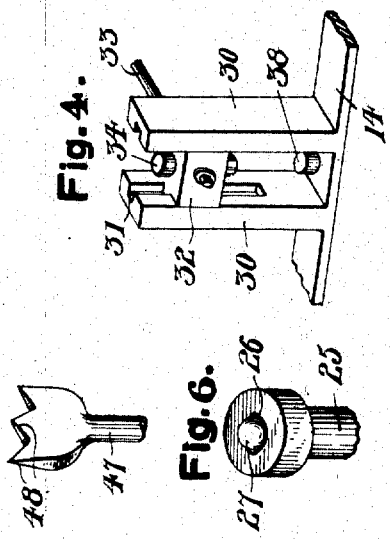
Witnesses
M. R. Kovalik
T. K. Bryant
Inventor
Stephan Banič
By A. M. Wilson
Attorney

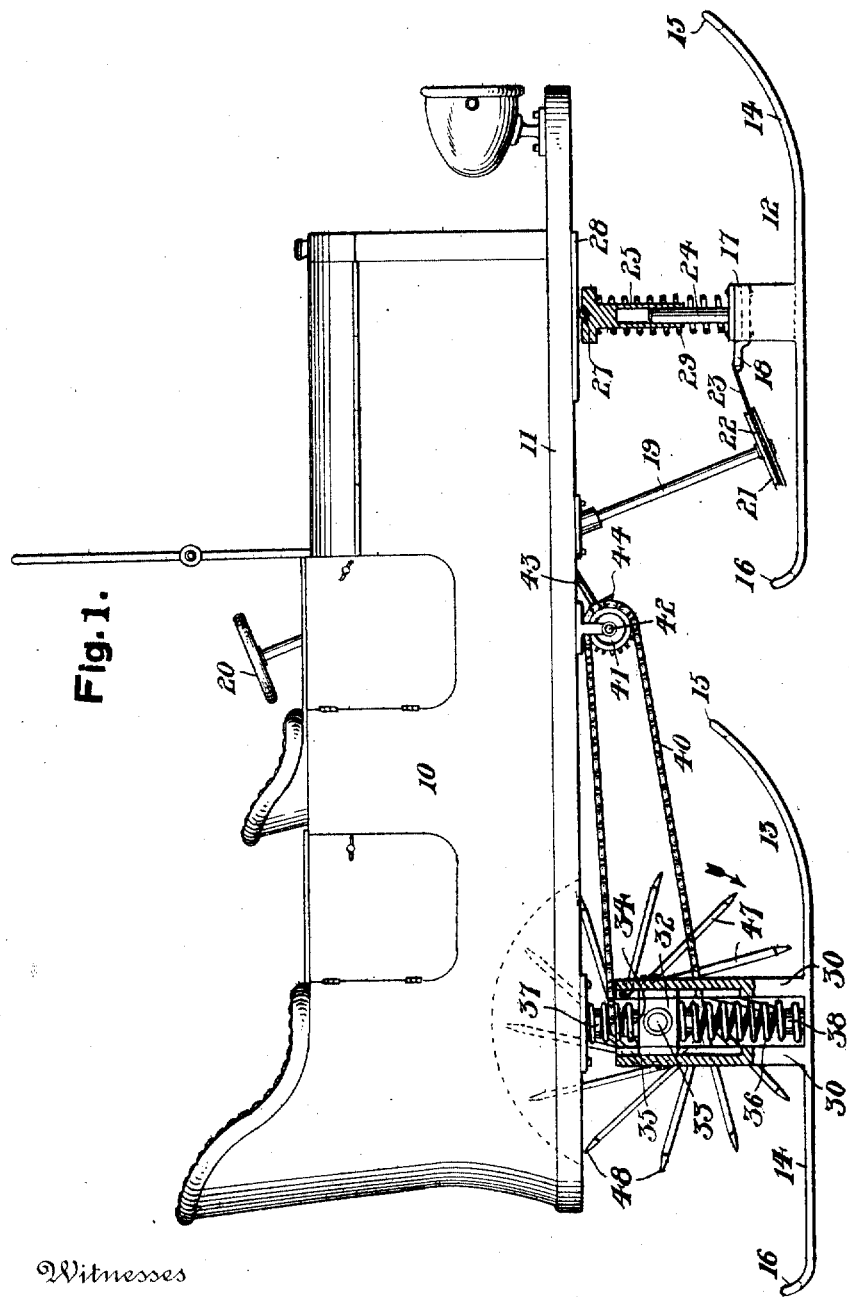

UNITED STATES PATENT OFFICE.

STEPHAN BANIČ, OF GREENVILLE, PENNSYLVANIA.

MOTOR-SLEIGH.

1,228,088.     Specification of Letters Patent.     Patented May 29, 1917.

Application filed April 22, 1914. Serial No. 833,792.

*To all whom it may concern:*

Be it known that I, STEPHAN BANIČ, a subject of the Emperor of Austria, residing at Greenville, in the county of Mercer and State of Pennsylvania, have invented certain new and useful Improvements in Motor-Sleighs, of which the following is a specification.

This invention relates to new and useful improvements in motor sleighs.

The primary object of this invention is to provide a sleigh resiliently mounted upon suitable runners and provided with a ground traction motor driving means.

A further object is to provide a traction wheel upon a sleigh adapted for propelling the same by engagement with the snow and ice of the roadbed and operable through a motor carried by the sleigh.

A still further object is the provision in a sleigh construction of spring mounted runners having a propelling tractor means journaled thereon.

With these general objects in view and others that will appear as the nature of the invention is better understood, the same consists in the novel combination and arrangement of parts hereinafter fully described, illustrated in the accompanying drawings and pointed out in the appended claim.

In the drawings forming a part of this application and in which like designating characters refer to corresponding parts throughout the several views:—

Figure 1 is a side elevation of a sleigh provided with the present invention, parts thereof being broken away.

Fig. 2 is a top plan view of the same with the sleigh body removed and portions broken away.

Fig. 3 is a front elevation of the forward runners partly in section, a portion of the sleigh being broken away.

Fig. 4 is a perspective view of the sleigh and shaft mounting means upon one of the rear runners and with the springs removed.

Fig. 5 is a perspective view of the engaging end portion of one of the tractor spokes, and Fig. 6 is a perspective view of one of the upper spring bearings for the forward runners and showing the anti-friction ball member employed therewith.

Referring more in detail to the drawings, the sleigh body 10 is illustrated provided with the platform or base 11 and whereby the sleigh is mounted upon the front and rear sets of runners or bobs 12 and 13 respectively.

Each bob consists of opposite side runners 14 connected together at their upturned forward ends by a cross piece 15 and at their upturned rear ends by cross pieces 16, it being noted that both the front and rear bobs are of substantially identical formation.

A connecting arch or bracket 17 is positioned between the runners 14 of the forward bob 12 and has rigidly secured thereto at its rear edge a T-shaped steering bar 18. A steering post 19 carried by the sleigh body for turning by the steering wheel 20 is provided with a disk 21 at its lower end having a peripheral groove 22 to accommodate a cable 23 running thereover and having its opposite ends secured to the opposite ends of the steering bar 18 and whereby as will be evident, any turning of the steering wheel 20 imparts the corresponding desired turning motion to the forward bob for the purpose of steering the sleigh.

The arch 17 is provided centrally as well as adjacent its opposite ends with upwardly projecting posts 24 adapted for telescoping within the central bores of upper post sections 25, the central one of which is rigidly secured to the sleigh base 11, while the other opposite ones are provided in their tops with recesses 26 each adapted to accommodate an anti-friction ball 27 for bearing against the lower face of a plate 28 on the under side of the said base 11.

Helical coil springs 29 are arranged surrounding the post 24 and members 25 being positioned between the arch 17 and the upper post members 25 and thereby providing a spring mounting for the sleigh upon the forward bob while at the same time accommodating the steering operation.

The rear bob is provided substantially centrally of each of its runners 14 with an upwardly projecting double bracket 30 having opposite slots 31 in its inner faces for the sliding reception of a block 32, the opposite blocks which are positioned upon the two runners of the rear bob having an operating shaft 33 journaled therein and positioned transversely beneath the sleigh body. Each of the blocks 32 is provided with similar top and bottom lugs 34 for receiving the encircling ends of upper and lower coil springs 35 and 36 respectively, while the other free ends of the said springs are seated over similar lugs 37 and 38 respectively.

The journaled shaft 33 is provided with opposite sprocket wheels 39 to accommodate sprocket chains 40 running thereover and also running over smaller sprocket wheels 41 upon a counter-shaft 42. The counter-shaft 42 is adapted to be revolved by the motor upon the sleigh by means of the power shaft 43 of the motor having a terminal pinion 44 meshing with a similar pinion 45 rigidly mounted upon the said counter-shaft and whereby as will be evident the motor may revolve the shaft 33 in either direction. The traction wheels are rigidly secured to the said journaled shaft 33 and are preferably provided two in number, each consisting of a central disk 46 secured to the shaft and having outwardly projecting inclined spokes or arms 47 rigidly mounted in the disk and provided with sharpened or toothed free ends 48 as best illustrated in Fig. 5 and which ends are adapted to contact the road-bed during a revolution of the journaled shaft 33 in the direction indicated by the arrow in Fig. 1 and thereby imparting a forward movement to the sleigh. The disposition of the inclined arms 47 with relation to the disk 46 and to one another is such that said arms are in substantially vertical position when they engage the ground such position being changed to a rearwardly-inclined position by the continued revolution of the shaft 33 to impart a forward push to the sleigh runners, which it has been found insures a speed of travel exceeding that of radially-projecting road-engaging devices.

The resilient mounting of the sleigh body upon the rear bob as just described also resiliently positions the journal power shaft 33 in the intermediate portions of the resilient mounting means through the agency of the slidable journal blocks 32. It will be noted that a spring mounting is thus provided for carrying the sleigh body upon both a forward and a rear bob, while a serviceable steering means is operatively connected to the forward bob and a propelling tractor means resiliently carried by the rear bob and operable from a motor within the sleigh body.

While the forms of the invention herein shown and described are what are believed to be preferable embodiments thereof, it is nevertheless to be understood that minor changes may be made in the form, proportion and details of construction without departing from the spirit and scope of the invention as set forth in the appended claim.

What I claim as new is:—

In a motor sleigh, the combination with a body and a pair of rear runners beneath the body, of a vertical guide extending upwardly from each runner and terminating at a point below said body, a bearing block mounted for vertical sliding movement in each guide, a traction shaft journaled in said bearing blocks, a traction member mounted on the shaft for contact with the ground, means for turning said shaft, springs in the upper ends of the guides between the body and said bearing blocks, and springs arranged in the lower ends of the guides between said bearing blocks and the runners to urge the latter downwardly in contact with the ground.

In testimony whereof I affix my signature in presence of two witnesses.

STEPHAN BANIČ.

Witnesses:
SYLVESTER ZUJVČAK,
DOMINIK KUVINEC.

Copies of this patent may be obtained for five cents each, by addressing the "Commissioner of Patents, Washington, D. C."